(12) United States Patent
Ishimoto

(10) Patent No.: US 9,229,154 B2
(45) Date of Patent: Jan. 5, 2016

(54) BACKLIGHT UNIT

(75) Inventor: Yoshitake Ishimoto, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 43 days.

(21) Appl. No.: 14/122,210

(22) PCT Filed: May 21, 2012

(86) PCT No.: PCT/JP2012/062910
§ 371 (c)(1),
(2), (4) Date: Nov. 25, 2013

(87) PCT Pub. No.: WO2012/161153
PCT Pub. Date: Nov. 29, 2012

(65) Prior Publication Data
US 2014/0085931 A1    Mar. 27, 2014

(30) Foreign Application Priority Data

May 26, 2011 (JP) .................................. 2011-118138

(51) Int. Cl.
*F21V 8/00* (2006.01)
*F21V 29/00* (2015.01)
*G02F 1/1335* (2006.01)

(52) U.S. Cl.
CPC ............ *G02B 6/0085* (2013.01); *G02B 6/0068* (2013.01); *G02F 1/133615* (2013.01); *G02F 2001/133628* (2013.01)

(58) Field of Classification Search
CPC ................ G02B 6/0068; G02B 6/0085; G02F 2001/133628; G02F 1/133615
USPC ................................................. 362/600–634
See application file for complete search history.

(56) References Cited

U.S. PATENT DOCUMENTS

| | | | |
|---|---|---|---|
| 7,553,055 B2 | 6/2009 | Liu | |
| 8,556,489 B2 * | 10/2013 | Cheng | H04M 1/22 362/612 |
| 2008/0084710 A1 | 4/2008 | Ohno | |
| 2010/0277664 A1 | 11/2010 | Kim et al. | |
| 2013/0094245 A1 * | 4/2013 | Kanda | G02B 6/0085 362/611 |

FOREIGN PATENT DOCUMENTS

| | | | |
|---|---|---|---|
| JP | 2008-97877 A | | 4/2008 |
| JP | 2008-299181 A | | 12/2008 |
| JP | 2009-25679 A | | 2/2009 |
| JP | 2009-140842 A | | 6/2009 |
| JP | 2010-092670 A | | 4/2010 |
| JP | 2010-262292 A | | 11/2010 |
| JP | 2010-282911 A | | 12/2010 |
| JP | 2012-14949 A | | 1/2012 |
| JP | 2012014949 A | * | 1/2012 |

* cited by examiner

*Primary Examiner* — Anh Mai
*Assistant Examiner* — Nathaniel Lee
(74) *Attorney, Agent, or Firm* — Chen Yoshimura LLP

(57) ABSTRACT

A backlight unit includes: light sources; a light guide member (120) arranged at a prescribed gap to the light sources such that light from the light sources enters from respective side faces (121) and exits from a light exiting surface (122); a first extending part (181) that extends along the side face (121) of the light guide member (120); and a second extending part (182) that extends along a surface of the light guide member (120) that is opposite to the light exiting surface (122). The backlight unit is provided with heat dissipation plates (180) that dissipate heat generated by the light sources. Each heat dissipation plate (180) has a larger area at the top portion than the bottom portion when the backlight unit is installed in a liquid crystal display device (1).

12 Claims, 6 Drawing Sheets

BACKLIGHT UNIT

TECHNICAL FIELD

The present invention relates to a backlight unit, and in particular relates to an edge-lit backlight unit.

BACKGROUND ART

Japanese Patent Application Laid-Open Publication No. 2009-25679 (Patent Document 1) is related art that describes an illumination device provided with a heat dissipation plate. The line-shaped illumination device disclosed in Japanese Patent Application Laid-Open Publication No. 2009-25679 (Patent Document 1) has LEDs (light emitting diodes) mounted thereon, on a mounting substrate that is constituted of insulating resin and wiring patterns.

The metal heat dissipation plate is bonded via a heat transfer member to the surface of the mounting substrate, which is opposite to the LED mounting surface, and the heat generated by the LEDs is transferred to the heat dissipation plate. The surface of the heat dissipation plate opposite to the surface thereof that is bonded to the mounting substrate makes contact with air currents created by the operation of the line-shaped illumination device, thereby releasing heat from the heat dissipation plate that has been generated by the LEDs.

RELATED ART DOCUMENT

Patent Document

Patent Document 1: Japanese Patent Application Laid-Open Publication No. 2009-25679

SUMMARY OF THE INVENTION

Problems to be Solved by the Invention

The air that has been warmed by the heat generated from the light sources rises from the bottom portion to the top portion. As a result, the temperature inside the display device provided with this illumination device increases because the warm air accumulates at the top portion. Variation in light source performance occurs when there is a temperature difference inside the display device, lowering the display screen quality.

The present invention was made in view of the above-mentioned problems, and aims at providing a backlight unit in which display screen quality can be improved by reducing a temperature difference inside a display device.

Means for Solving the Problems

A backlight unit configured for a display device with a display surface that has a top side portion and a bottom side portion includes: light sources; a light guide member arranged at a prescribed gap from the light sources such that light from the light source enters from respective side faces of the light guide member and exits from a light exiting surface thereof; and heat dissipation plates, each including a first extending part that extends along the respective side face of the light guide member and a second extending part that extends along a surface of the light guide member that is opposite to the light exiting surface, the heat dissipation plates dissipating heat that is generated by the light sources, wherein each of the heat dissipation plates is configured to have a larger heat dissipation area at a top portion than a bottom portion thereof when the backlight unit is installed in the display device.

In one aspect of the present invention, the first extending part of each of the heat dissipation plates has a larger heat dissipation area at the top portion than the bottom portion when the backlight unit is installed in the display device.

In one aspect of the present invention, the second extending part of each of the heat dissipation plates has a larger heat dissipation area at the top portion than the bottom portion when the backlight unit is installed in the display device.

In one aspect of the present invention, each of the heat dissipation plates has a gradually larger heat dissipation area from the bottom portion to the top portion when the backlight unit is installed in the display device.

In one aspect of the present invention, each of the heat dissipation plates has a heat dissipation area that stepwisely increases from the bottom portion to the top portion when the backlight unit is installed in the display device.

In one aspect of the present invention, printed wiring lines are formed on the respective heat dissipation plates.

In one aspect of the present invention, the light sources are LEDs.

In one aspect of the present invention, the LEDs are mounted on a circuit substrate.

In one aspect of the present invention, the circuit substrate is fixed to the respective heat dissipation plates by a fastening member.

In one aspect of the present invention, the circuit substrate is fixed to the respective heat dissipation plates by an adhesive member having thermal conductivity.

In one aspect of the present invention, the circuit substrate is directly mounted on the respective heat dissipation plates such that the printed wiring lines electrically connect with the circuit substrate.

In one aspect of the present invention, a material of the heat dissipation plates is any one of iron, aluminum, or copper.

Effects of the Invention

According to the present invention, display screen quality can be improved by reducing a temperature difference inside a display device.

DETAILED DESCRIPTION OF EMBODIMENTS

Figure 1:
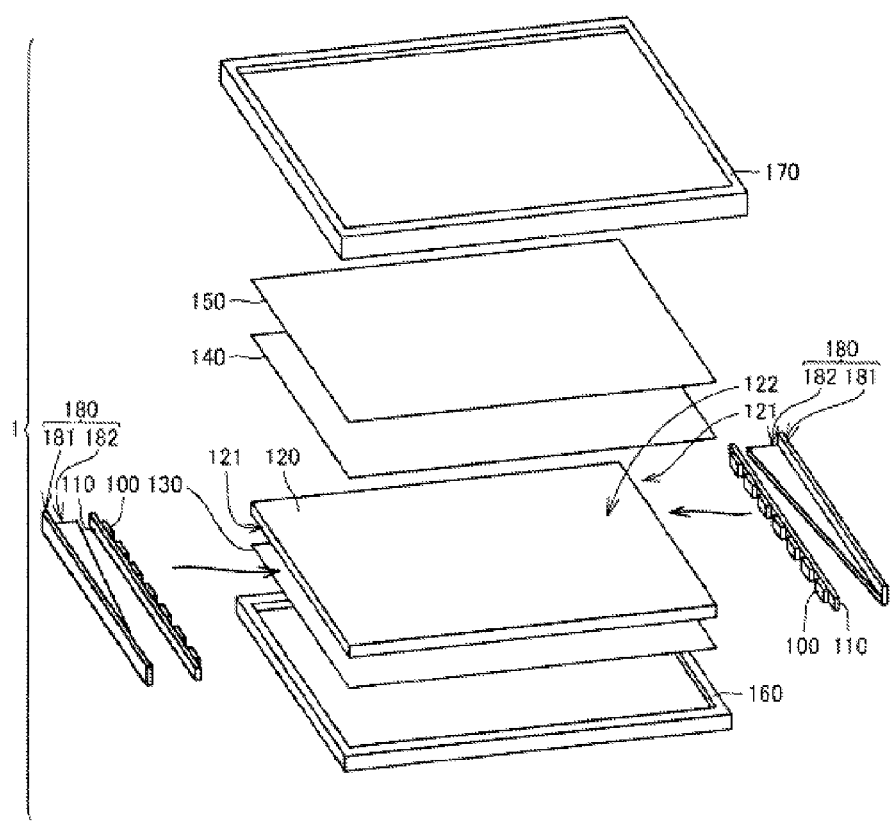
FIG. 1 is an exploded perspective view showing a configuration of a liquid crystal display device.

A backlight unit of Embodiment 1 of the present invention will be explained below. In the descriptions for embodiments below, identical or corresponding portions in the respective drawings are given the same reference characters, and descriptions thereof will not be repeated. In the present embodiment a liquid crystal display device will be explained as a display device, but the display device is not limited thereto, and the present invention can be applied to a display device that includes light sources that emit heat, and a light guide member.

Embodiment 1

Figure 2:
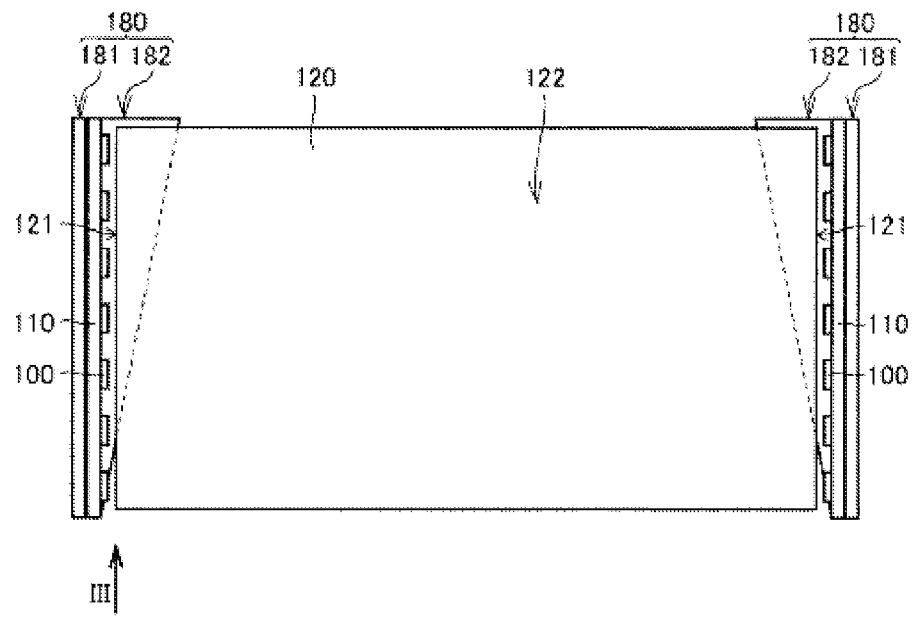
FIG. 2 is a front view showing a configuration of a backlight unit according to Embodiment 1 of the present invention.
Figure 3:
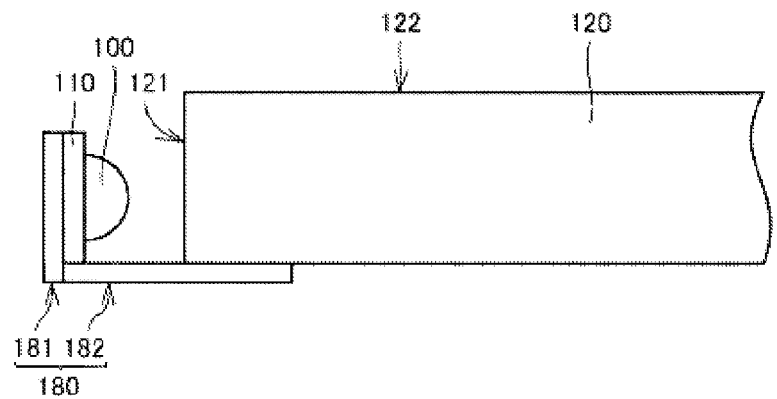
FIG. 3 is a side view along the direction of the arrow III in FIG. 2, showing of a portion of the backlight unit in Embodiment 1.

FIG. 1 is an exploded perspective view showing a configuration of a liquid crystal display device. FIG. 2 is a front view showing a configuration of a backlight unit according to Embodiment 1 of the present invention. FIG. 3 is a side view along the direction of the arrow III in FIG. 2, showing of a portion of the backlight unit in Embodiment 1. In FIG. 3, for simplicity a reflective sheet 130 is not shown.

As shown in FIG. 1, a liquid crystal display device 1 is provided with a bezel 170, a chassis 160, the reflective sheet 130, a light guide member 120, stacked sheets 140, a liquid crystal display panel 150, LEDs 100 that are light sources, circuit substrates 110, and heat dissipation plates 180. Arranged between the bezel 170 and chassis 160 are, in order from the bottom, the reflective sheet 130, light guide member 120, stacked sheets 140, and liquid crystal display panel 150.

LEDs 100 are used as the light sources in the present embodiment, but the light sources are not limited thereto, and fluorescent tubes or other light sources may be used.

The reflective sheet 130 is made of polyester, for example. The reflective sheet 130 is made of foamed PET (polyethylene terephthalate), and has light reflecting characteristics. The reflective sheet 130 functions to reflect light that has leaked from the rear of the light guide member 120 back to the light guide member 120.

The stacked sheets 140 contain a diffusion sheet and a prism sheet. The stacked sheets 140 function to suppress uneven brightness of light exiting the light guide member 120, and to condense light from the light guide member 120 and emit this light towards the liquid crystal display panel 150.

The liquid crystal display panel 150 contains an active matrix substrate, color filters, an opposite substrate, and liquid crystal sealed between the active matrix substrate and opposite substrate. A plurality of TFT (thin film transistor) elements are formed on the active matrix substrate. The liquid crystal display panel 150 displays images by using light that has passed through the stacked sheets 140 and that is incident on the liquid crystal display panel 150.

The bezel 170 has a window portion that makes the display surface of the display region of the liquid crystal display panel 150 visible. The chassis 160 has frame-shaped side walls and a bottom.

The vertical direction of the liquid crystal display device 1 when the backlight unit when the backlight unit is installed coincides with the vertical direction in FIG. 2. In other words, in the present embodiment, the liquid crystal display device 1 has a display surface that intersects the horizontal direction at 90° the backlight unit is installed in the display device. However, the backlight unit being installed into the liquid crystal display device 1 is not limited thereto, and the liquid crystal display device may have a display surface that intersects the horizontal direction at a prescribed angle.

As shown in FIGS. 1 and 2, in the present embodiment the light guide member 120 has a rectangular cuboid shape. The light guide member 120 is arranged at a prescribed distance from the LEDs 100 such that the light from the LEDs 100 enters from a side face of the light guide member 120 and exits from a light exiting surface. In the present embodiment, the circuit substrates 110, which have a plurality of LEDs 100 mounted thereon at prescribed gaps from each other, are arranged on both short sides of the light guide member 120.

The light guide member 120 has a light incident surface 121 that is positioned so as to face the plurality of LEDs 100 and that is a side face on which light from the LEDs 100 is incident, and a light exiting surface 122 that is adjacent to the light incident surface 121. The light guide member 120 propagates light inside the light guide member 120 while totally reflecting light from the light incident surface 121. This light mainly exits from the light exiting surface 122.

As shown in FIGS. 2 and 3, each heat dissipation plate 180 includes a first extending part 181 that extends along the light incident surface 121 of the light guide member 120, and a second extending part 182 that extends along a surface of the light guide member 120 that is opposite to the light exiting surface 122. The dissipation plates dissipate heat that is generated by the LEDs 100. In the present embodiment, the heat dissipation plates 180 are made of aluminum, but the material of the heat dissipation plates 180 is not limited thereto, and may be any material with excellent thermal conductivity such as iron or copper. Printed wiring lines are formed on a main surface of each heat dissipation plate 180.

The first extending part 181 of each heat dissipation plate 180 is arranged so as to be in contact with a surface of the circuit substrate 110 that is opposite to the side on which the LEDs 100 are mounted. The first extending parts 181 have a rectangular cuboid shape.

The second extending part 182 of each heat dissipation plate 180 extends from the first extending part 181 towards the light guide member 120. The second extending parts 182 have a right triangular shape when viewed in the direction perpendicular to the light exiting surface 122 of the light guide member 120.

Each heat dissipation plate 180 is fixed to the respective circuit substrate 110 by a metal fastening member such as a screw. However, the fixing method of the heat dissipation plates 180 and the circuit substrates 110 is not limited thereto, and each circuit substrate 110 may be fixed to the respective heat dissipation plate 180 by an adhesive member with thermal conductivity that is made of a compound of a ceramic filler and silicone, for example. Each heat dissipation plate 180 has the respective circuit substrate 110 mounted directly thereon such that the printed wiring lines formed on the main surface of the heat dissipation plate 180 and the circuit substrate 110 are electrically connected. With this configuration, ON/OFF signals for the LEDs 100 can be transmitted and received via the heat dissipation plate 180.

The second extending part 182 of each heat dissipation plate 180 has a larger area at the top portion than the bottom portion when the backlight unit is installed in the liquid crystal display device 1. Each heat dissipation plate 180 has a gradually larger heat dissipation area from the bottom portion to top portion when the backlight unit is installed in the liquid crystal display device 1.

Providing the heat dissipation plates 180 with the configuration described above allows the liquid crystal display device 1 to be cooled by more extensively dissipating heat in the top portion, which is susceptible to high temperatures, than the bottom portion. As a result, the temperature difference inside the liquid crystal display device 1 can be reduced.

Thus, variation in performance between the LEDs 100 located at the top portion and LEDs 100 located at the bottom portion can be suppressed. As a result, the display screen quality of the liquid crystal display device 1 can be improved by reducing the variation in light emitted from the light exiting surface 122 of the light guide member 120.

Furthermore, the portion of the heat dissipation plate 180 located at the bottom of the liquid crystal display device 1 can be removed, which allows the heat dissipation plate 180 to be made lighter and the cost of materials to be reduced. In the present embodiment, the second extending part 182 of each heat dissipation plate 180 extends towards the light guide member 120, and thus, an increase in the frame dimensions of the liquid crystal display device 1 can be suppressed by providing the heat dissipation plates 180.

Figure 4:
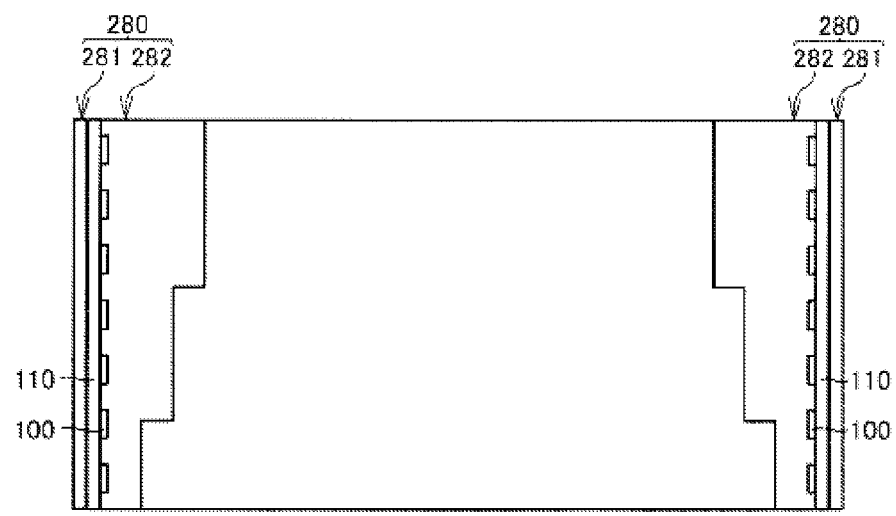
FIG. 4 is a front view showing a configuration of the backlight unit in a first modification example of Embodiment 1.

FIG. 4 is a front view showing a configuration of the backlight unit in Modification Example 1 of the present embodiment. As shown in FIG. 4, the backlight unit in Modification Example 1 of the present embodiment is provided with heat dissipation plates 280.

Each heat dissipation plate 280 contains a first extending part 281 that extends along the light incident surface 121 of the light guide member 120, and a second extending part 282 that extends along a surface of the light guide member 120 that is opposite to the light exiting surface 122.

Specifically, the first extending part 281 of each heat dissipation plate 280 is arranged so as to be in contact with a surface of the circuit substrate 110 that is opposite to the side on which the LEDs 100 are mounted. The first extending parts 281 have a rectangular cuboid shape.

The second extending part 282 of each heat dissipation plate 280 extends from the first extending part 281 towards the light guide member 120. The second extending part 282 has stepwise shape that becomes wider from the bottom portion to the top portion of the liquid crystal display device 1 when viewed in the direction perpendicular to the light exiting surface 122 of the light guide member 120.

In other words, the second extending part 282 of each heat dissipation plate 280 has a larger area at the top portion than the bottom portion when the backlight unit is installed in the liquid crystal display device 1. Each heat dissipation plate 280 has a heat dissipation area that stepwisely increases from the bottom portion to the top portion when the backlight unit is installed in the liquid crystal display device 1.

The heat dissipation plates 280 of Modification Example 1 also allow the liquid crystal display device 1 to be cooled by more extensively dissipating heat in the top portion, which is susceptible to high temperatures, than the bottom portion. As a result, the temperature difference inside the liquid crystal display device 1 can be reduced.

Figure 5:
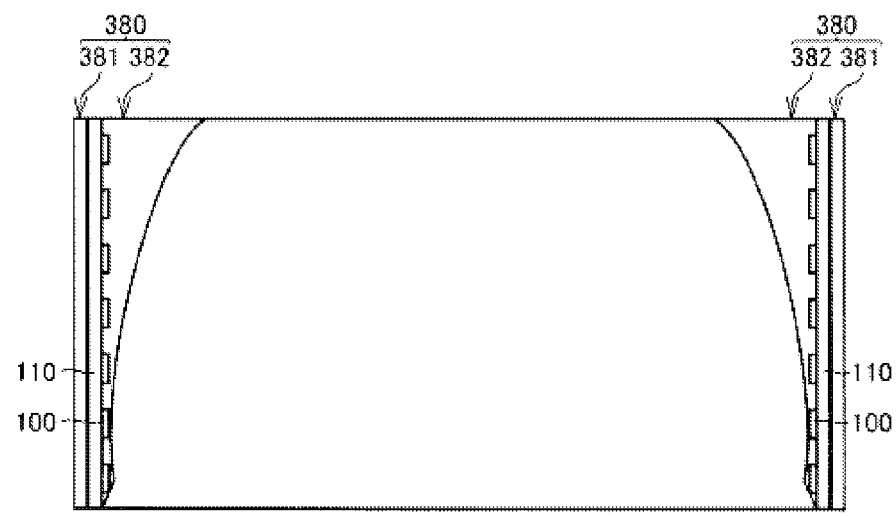
FIG. 5 is a front view showing a configuration of the backlight unit in a second modification example of Embodiment 1.

FIG. 5 is a front view showing a configuration of the backlight unit in Modification Example 2 of the present embodiment. As shown in FIG. 5, the backlight unit in Modification Example 2 of the present embodiment is provided with heat dissipation plates 380.

Each heat dissipation plate 380 includes a first extending part 381 that extends along the light incident surface 121 of the light guide member 120, and a second extending part 382 that extends along a surface of the light guide member 120 that is opposite to the light exiting surface 122.

Specifically, the first extending part 381 of each heat dissipation plate 380 is arranged so as to be in contact with a surface of the circuit substrate 110 that is opposite to the side on which the LEDs 100 are mounted. The first extending parts 381 have a rectangular cuboid shape.

The second extending part 382 of each heat dissipation plate 380 extends from the first extending part 381 towards the light guide member 120. The second extending part 382 becomes incrementally wider from the bottom portion to the top portion of the liquid crystal display device 1 when viewed in the direction perpendicular to the light exiting surface 122 of the light guide member 120.

In other words, the second extending part 382 of each heat dissipation plate 380 has a larger area at the top portion than the bottom when the backlight unit is installed in the liquid crystal display device 1. Each heat dissipation plate 380 has a gradually larger heat dissipation area from the bottom portion to the top portion when the backlight unit is installed in the liquid crystal display device 1.

The heat dissipation plates 380 of Modification Example 2 also allow the liquid crystal display device 1 to be cooled by more extensively dissipating heat in the top portion, which is susceptible to high temperatures, than the bottom portion. As a result, the temperature difference inside the liquid crystal display device 1 can be reduced.

Figure 6:
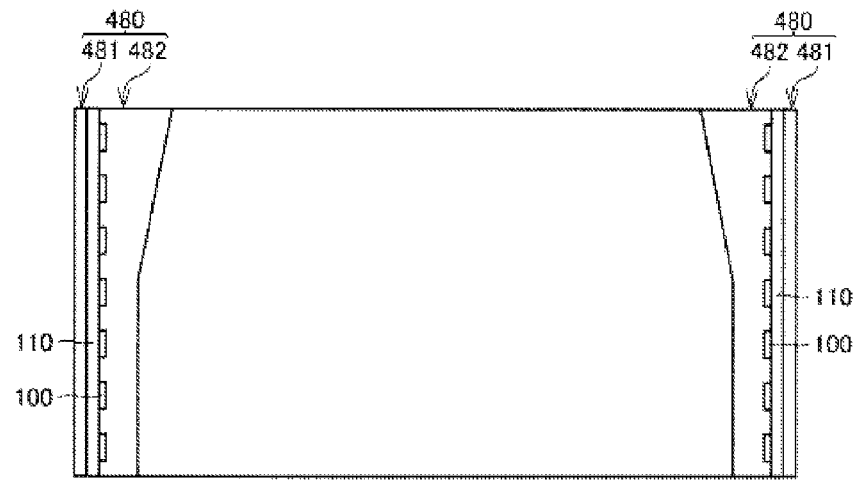
FIG. 6 is a front view showing a configuration of the backlight unit in a third modification example of Embodiment 1.

FIG. 6 is a front view showing a configuration of the backlight unit in Modification Example 3 of the present embodiment. As shown in FIG. 6, the backlight unit in Modification Example 3 of the present embodiment is provided with heat dissipation plates 480.

Each heat dissipation plate 480 includes a first extending part 481 that extends along the light incident surface 121 of the light guide member 120, and a second extending part 482 that extends along a surface of the light guide member 120 that is opposite to the light exiting surface 122.

Specifically, the first extending part 481 of each heat dissipation plate 480 is arranged so as to be in contact with a surface of the circuit substrate 110 that is opposite to the side on which the LEDs 100 are mounted. The first extending parts 481 have a rectangular cuboid shape.

The second extending part 482 of each heat dissipation plate 480 extends from the first extending part 481 towards the light guide member 120. The second extending part 482 has a uniform width on the lower half of the liquid crystal display device 1, but becomes incrementally wider on the upper half when viewed in the direction perpendicular to the light exiting surface 122 of the light guide member 120.

In other words, the second extending part 482 of each heat dissipation plate 480 has a larger area at the top portion than the bottom portion when the backlight unit is installed in the liquid crystal display device 1. Each heat dissipation plate 480 has a heat dissipation area that stepwisely increases from the bottom portion to the top portion when the backlight unit is installed in the liquid crystal display device 1.

The heat dissipation plates 480 of Modification Example 3 also allow the liquid crystal display device 1 to be cooled by more extensively dissipating heat in the top portion, which is susceptible to high temperatures, than the bottom portion. As a result, the temperature difference inside the liquid crystal display device 1 can be reduced.

Figure 7:
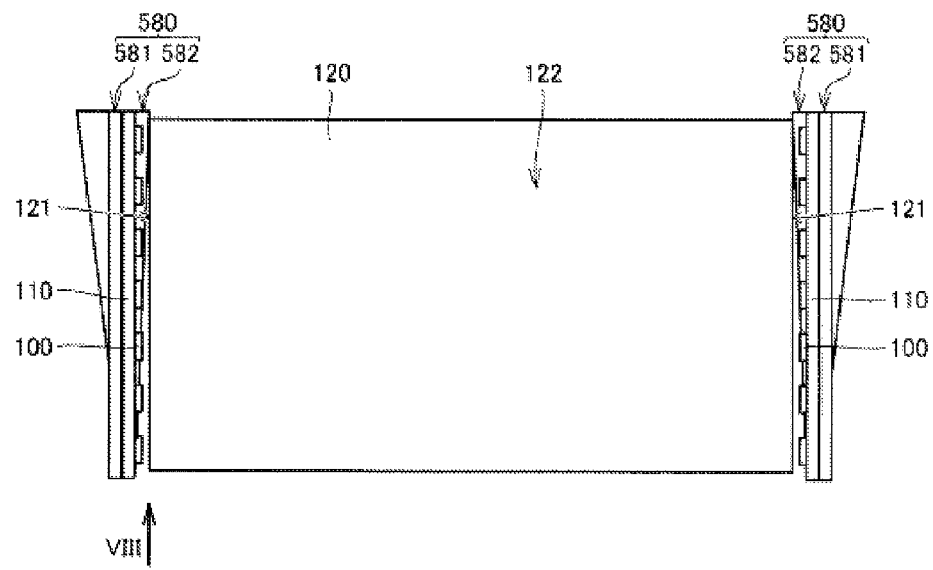
FIG. 7 is a front view showing a configuration of the backlight unit in a fourth modification example of Embodiment 1.
Figure 8:
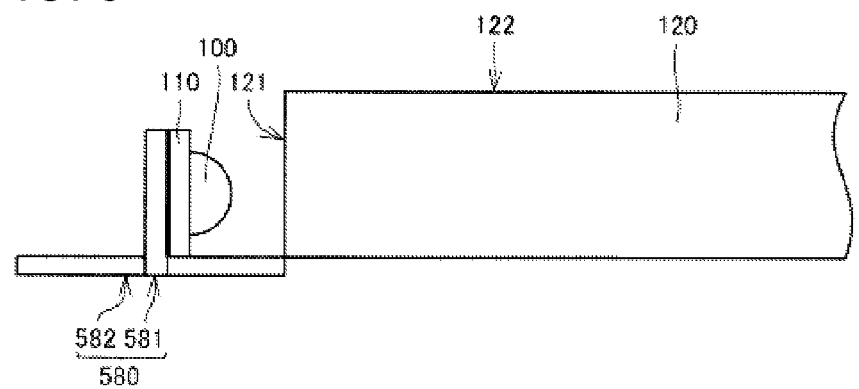
FIG. 8 is a side view along the direction of the arrow VIII in FIG. 7, showing of a portion of the backlight unit in the fourth modification example of Embodiment 1.

FIG. 7 is a front view showing a configuration of the backlight unit in Modification Example 4 of the present embodiment. FIG. 8 is a side view along the direction of the arrow VIII in FIG. 7, showing of a portion of the backlight unit in Modification Example 4 of the present embodiment. In FIG. 8, for simplicity, the reflective sheet 130 is not shown.

As shown in FIGS. 7 and 8, the backlight unit in Modification Example 4 of the present embodiment is provided with heat dissipation plates 580. Each heat dissipation plate 580 includes a first extending part 581 that extends along the light incident surface 121 of the light guide member 120, and a second extending part 582 that extends along a surface of the light guide member 120 that is opposite to the light exiting surface 122.

Specifically, the first extending part 581 of each heat dissipation plate 580 is arranged so as to be in contact with a surface of the circuit substrate 110 that is opposite to the side on which the LEDs 100 are mounted. The first extending parts 581 have a rectangular cuboid shape.

The second extending part 582 of each heat dissipation plate 580 extends from the first extending part 581 towards the light guide member 120 and the side opposite to the light guide member 120. The second extending part 582 becomes incrementally wider from the bottom portion to the top portion of the liquid crystal display device 1 when viewed in the direction perpendicular to the light exiting surface 122 of the light guide member 120.

In other words, the second extending part 582 of each heat dissipation plate 580 has a larger area at the top portion than the bottom portion when the backlight unit is installed in the liquid crystal display device 1. Each heat dissipation plate 580 has a gradually larger heat dissipation area from the bottom portion to the top portion when the backlight unit is installed in the liquid crystal display device 1.

The heat dissipation plates 580 of Modification Example 4 also allow the liquid crystal display device 1 to be cooled by more extensively dissipating heat in the top portion, which is susceptible to high temperatures, than the bottom portion. As a result, the temperature difference inside the liquid crystal display device 1 can be reduced.

A backlight unit of Embodiment 2 of the present invention will be explained below. The backlight unit of the present embodiment only differs from the backlight unit of Embodiment 1 in a configuration of a heat dissipation plate, and thus explanation of other elements will not be repeated.

Embodiment 2

Figure 9:
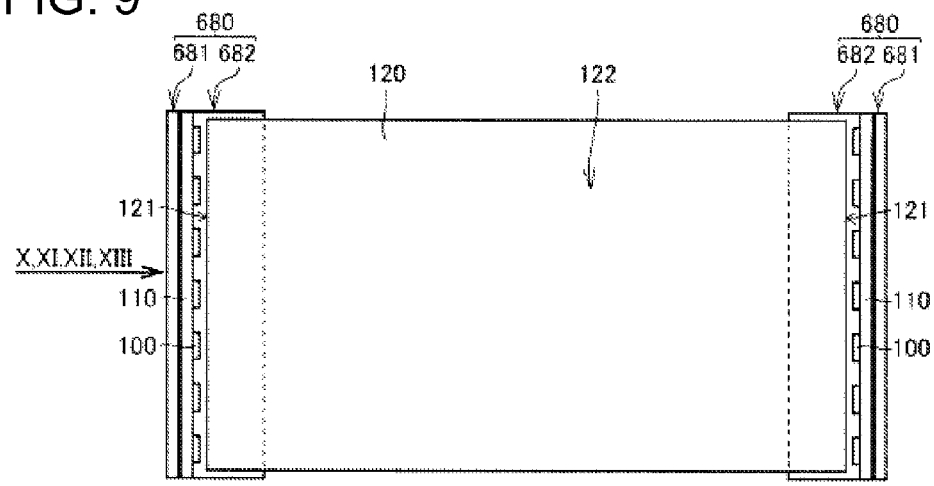
FIG. 9 is a front view showing a configuration of a backlight unit according to Embodiment 2 of the present invention.
Figure 10:
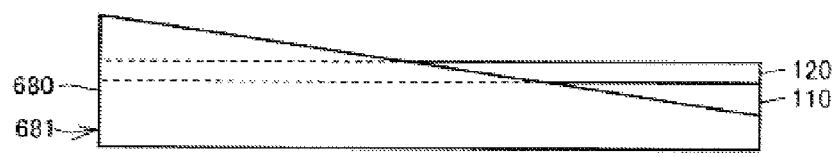
FIG. 10 is a side view along the direction of the arrow X in FIG. 9, showing the backlight unit in Embodiment 2.

FIG. 9 is a front view showing a configuration of a backlight unit according to Embodiment 2 of the present invention. FIG. 10 is a side view along the direction of the arrow X in FIG. 9, showing the backlight unit of the present embodiment.

The vertical direction when the backlight unit is installed in a liquid crystal display device 1 coincides with the vertical direction in FIG. 9. In other words, in the present embodiment, when the backlight unit is installed the liquid crystal display device 1 has a display surface that intersects the horizontal direction at 90°. However, the backlight unit being installed into the liquid crystal display device 1 is not limited thereto, and the liquid crystal display device may have a display surface that intersects the horizontal direction at a prescribed angle.

As shown in FIGS. 9 and 10, each heat dissipation plate 680 includes a first extending part 681 that extends along a light incident surface 121 of a light guide member 120, and a second extending part 682 that extends along a surface of the light guide member 120 that is opposite to the light exiting surface 122. The dissipation plates 680 dissipate heat that is generated by LEDs 100. In the present embodiment, the heat dissipation plates 680 are made of aluminum, but the material of the heat dissipation plates 680 are not limited thereto, and may be any material with excellent thermal conductivity such as iron or copper.

Specifically, the first extending part 681 of each heat dissipation plate 680 is arranged so as to be in contact with a surface of a circuit substrate 110 that is opposite to the side on which the LEDs 100 are mounted. The first extending part 681 has a trapezoidal shape that increases in height from the bottom portion to the top portion of the liquid crystal display device 1 when viewed in the direction perpendicular to the light incident surface 121 of the light guide member 120.

The second extending part 682 of each heat dissipation plate 680 extends from the first extending part 681 towards the light guide member 120. The second extending part 682 has a rectangular shape when viewed in the direction perpendicular to the light exiting surface 122 of the light guide member 120.

In other words, the first extending part 681 of each heat dissipation plate 680 has a larger area at the top portion than the bottom portion when the backlight unit is installed in the liquid crystal display device 1. Each heat dissipation plate 680 has a gradually larger heat dissipation area from the bottom portion to the top portion when the backlight unit is installed in the liquid crystal display device 1.

Providing the heat dissipation plates 680 with the configuration described above allows the liquid crystal display device 1 to be cooled by more extensively dissipating heat in the top portion, which is susceptible to high temperatures, than the bottom portion. As a result, the temperature difference inside the liquid crystal display device 1 can be reduced.

Thus, variation in performance between the LEDs 100 located at the top portion and LEDs 100 located at the bottom portion can be suppressed. As a result, the display screen quality of the liquid crystal display device 1 can be improved by reducing the variation in light emitted from the light exiting surface 122 of the light guide member 120.

Furthermore, the portion of the heat dissipation plate 680 located at the bottom portion of the liquid crystal display device 1 can be removed, which allows the heat dissipation plate 680 to be made lighter and the cost of materials to be reduced. In the present embodiment, the second extending part 682 of each heat dissipation plate 680 extends towards the light guide member 120, and thus, an increase in the frame dimensions of the liquid crystal display device 1 can be suppressed by providing the heat dissipation plates 680.

Figure 11:
FIG. 11 is a side view along the direction of the arrow XI in FIG. 9, showing the backlight unit in a first modification example of Embodiment 2.

FIG. 11 is a side view along the direction of the arrow XI in FIG. 9, showing a backlight unit in Modification Example 1 of the present embodiment. As shown in FIG. 11, the backlight unit in the first modification example of the present embodiment is provided with heat dissipation plates 780.

Each heat dissipation plate 780 includes a first extending part 781 that extends along the light incident surface 121 of the light guide member 120, and a second extending part that extends so as to be along a surface of the light guide member 120 that is opposite to the light exiting surface 122. The second extending part of each heat dissipation plate 780 has the same shape as the second extending part 682 of the heat dissipation plate 680 in Embodiment 2.

The first extending part 781 of each heat dissipation plate 780 is arranged so as to be in contact with a surface of the circuit substrate 110 that is opposite to the side on which the LEDs 100 are mounted. The first extending part 781 has a stepwise shape that increases in height from the bottom portion to the top portion of the liquid crystal display device 1 when viewed in the direction perpendicular to the light incident surface 121 of the light guide member 120.

In other words, the first extending part 781 of each heat dissipation plate 780 has a larger area at the top portion than the bottom portion when the backlight unit is installed in the liquid crystal display device 1. Each heat dissipation plate 780 has a heat dissipation area that stepwisely increases from the bottom portion to the top portion when the backlight unit is installed in the liquid crystal display device 1.

The heat dissipation plates 780 of Modification Example 1 also allow the liquid crystal display device 1 to be cooled by more extensively dissipating heat in the top portion, which is susceptible to high temperatures, than the bottom portion. As a result, the temperature difference inside the liquid crystal display device 1 can be reduced.

Figure 12:
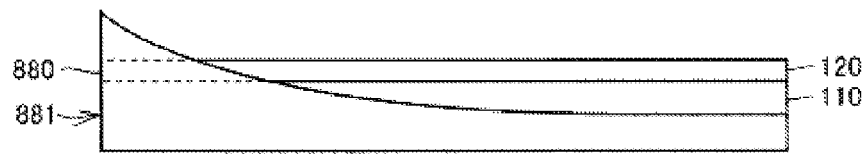
FIG. 12 is a side view along the direction of the arrow XII in FIG. 9, showing the backlight unit in a second modification example of Embodiment 2.

FIG. 12 is a side view along the direction of the arrow XII in FIG. 9, showing a backlight unit in Modification Example 2 of the present embodiment. As shown in FIG. 12, the backlight unit in the second modification example of the present embodiment is provided with heat dissipation plates 880.

Each heat dissipation plate 880 includes a first extending part 881 that extends so as to be along the light incident surface 121 of the light guide member 120, and a second extending part that extends along a surface of the light guide member 120 that is opposite to the light exiting surface 122. The second extending part of each heat dissipation plate 880 has the same shape as the second extending part 682 of the heat dissipation plate 680 in Embodiment 2.

The first extending part 881 of each heat dissipation plate 880 is arranged so as to be in contact with a surface of the circuit substrate 110 that is opposite to the side on which the LEDs 100 are mounted. The first extending part 881 becomes incrementally greater in height from the bottom portion to the top portion of the liquid crystal display device 1 when viewed in the direction perpendicular to the light incident surface 121 of the light guide member 120.

In other words, the first extending part 881 of each heat dissipation plate 880 has a larger area at the top portion than the bottom portion when the backlight unit is installed in liquid crystal display device 1. Each heat dissipation plate 880 has a gradually larger heat dissipation area from bottom portion to the top portion when the backlight unit is installed in the liquid crystal display device 1.

The heat dissipation plates 880 of Modification Example 2 also allow the liquid crystal display device 1 to be cooled by more extensively dissipating heat in the top portion, which is susceptible to high temperatures, than the bottom portion. As a result, the temperature difference inside the liquid crystal display device 1 can be reduced.

Figure 13:
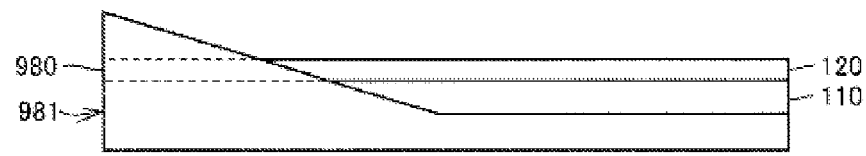
FIG. 13 is a side view along the direction of the arrow XIII in FIG. 9, showing the backlight unit in a third modification example of Embodiment 2.

FIG. 13 is a side view along the direction of the arrow XIII in FIG. 3, showing a backlight unit in Modification Example 3 of the present embodiment. As shown in FIG. 13, the backlight unit in Modification Example 3 of the present embodiment is provided with heat dissipation plates 980.

Each heat dissipation plate 980 includes a first extending part 981 that extends so as to be along the light incident surface 121 of the light guide member 120, and a second extending part that extends along a surface of the light guide member 120 that is opposite to the light exiting surface 122. The second extending part of each heat dissipation plate 980 has the same shape as the second extending part 682 of the heat dissipation plate 680 in Embodiment 2.

The first extending part 981 of each heat dissipation plate 980 is arranged so as to be in contact with a surface of the circuit substrate 110 that is opposite to the side on which the LEDs 100 are mounted. The first extending part 981 has a uniform width on the lower half of the liquid crystal display device 1, but becomes incrementally greater in height on the upper half when viewed in the direction perpendicular to the light incident surface 121 of the light guide member 120.

In other words, the first extending part 981 of each heat dissipation plate 980 has a larger area at the top portion than the bottom portion when the backlight unit is installed in the liquid crystal display device 1. Each heat dissipation plate 980 has a heat dissipation area that stepwisely increases from the bottom portion to the top portion when the backlight unit is installed in the liquid crystal display device 1.

The heat dissipation plates 980 of Modification Example 3 also allow the liquid crystal display device 1 to be cooled by more extensively dissipating heat in the top portion, which is susceptible to high temperatures, than the bottom portion. As a result, the temperature difference inside the liquid crystal display device 1 can be reduced.

The configurations of the backlight unit of Embodiment 1 and the configurations of the backlight unit in Embodiment 2 may have the mutually combinable parts thereof combined together.

The embodiments disclosed herein are examples in every respect and are not limiting. The scope of the present invention is defined by the claims, and all modifications with the same meaning as the claims and within the scope defined thereby are included.

DESCRIPTION OF REFERENCE CHARACTERS

1 liquid crystal display device
110 circuit substrate
120 light guide member
121 light incident surface
122 light exiting surface
130 reflective sheet
140 stacked sheets
150 liquid crystal display panel
160 chassis
170 bezel
180, 280, 380, 480, 580, 680, 780, 880, 980 heat dissipation plate
181, 281, 381, 481, 581, 681, 781, 881, 981 first extending part
182, 282, 382, 482, 582, 682 second extending part

The invention claimed is:

1. A backlight unit configured for a display device with a display surface that has a top side portion and a bottom side portion, the backlight unit comprising:
   light sources;
   a light guide member arranged at a prescribed gap from the light sources such that light from the light source enters from respective side faces of the light guide member and exits from a light exiting surface thereof; and
   heat dissipation plates, each comprising a first extending part that extends along the respective side face of the light guide member and a second extending part that extends along a surface of the light guide member that is opposite to the light exiting surface, the heat dissipation plates dissipating heat that is generated by the light sources, wherein each of the heat dissipation plates is configured to have a larger heat dissipation area at a top portion than a bottom portion thereof when the backlight unit is installed in the display device.

2. The backlight unit according to claim 1,
wherein the first extending part of each of the heat dissipation plates has a larger heat dissipation area at the top portion than the bottom portion when the backlight unit is installed in the display device.

3. The backlight unit according to claim 1,
wherein the second extending part of each of the heat dissipation plates has a larger heat dissipation area at the top portion than the bottom portion when the backlight unit is installed in the display device.

4. The backlight unit according to claim 1,
wherein each of the heat dissipation plates has a gradually larger heat dissipation area from the bottom portion to the top portion when the backlight unit is installed in the display device.

5. The backlight unit according to claim 1,
wherein each of the heat dissipation plates has a heat dissipation area that stepwisely increases from the bottom portion to the top portion when the backlight unit is installed in the display device.

6. The backlight unit according to claim 1,
wherein printed wiring lines are formed on the respective heat dissipation plates.

7. The backlight unit according to claim 6,
wherein the light sources are LEDs.

8. The backlight unit according to claim 7,
wherein the LEDs are mounted on a circuit substrate.

9. The backlight unit according to claim 8,
wherein the circuit substrate is fixed to the respective heat dissipation plates by a fastening member.

10. The backlight unit according to claim 9,
wherein the circuit substrate is directly mounted on the respective heat dissipation plates such that the printed wiring lines electrically connect with the circuit substrate.

11. The backlight unit according to claim 8,
wherein the circuit substrate is fixed to the respective heat dissipation plates by an adhesive member having thermal conductivity.

12. The backlight unit according to claim 1,
wherein a material of the heat dissipation plates is any one of iron, aluminum, or copper.

* * * * *